April 9, 1935.  K. T. POTTHOFF  1,997,013
METHOD AND APPARATUS FOR TREATING PIPES
Filed Nov. 18, 1930  9 Sheets-Sheet 1
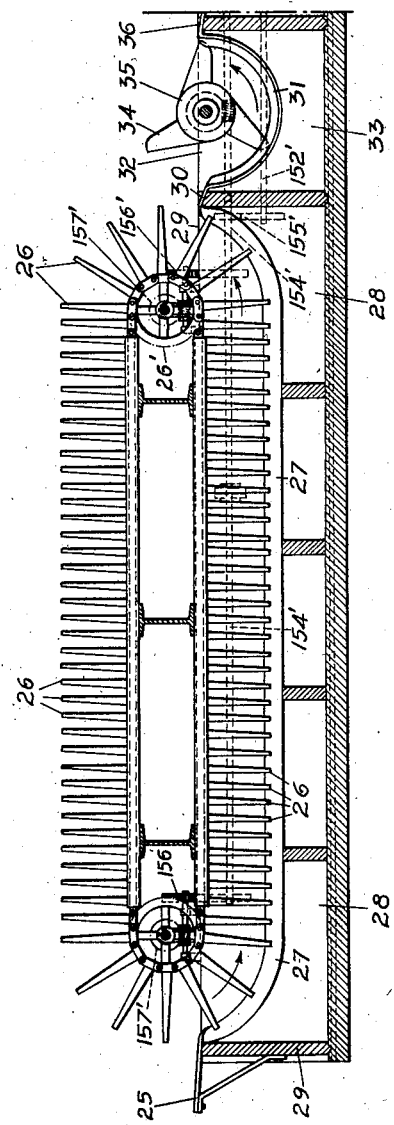
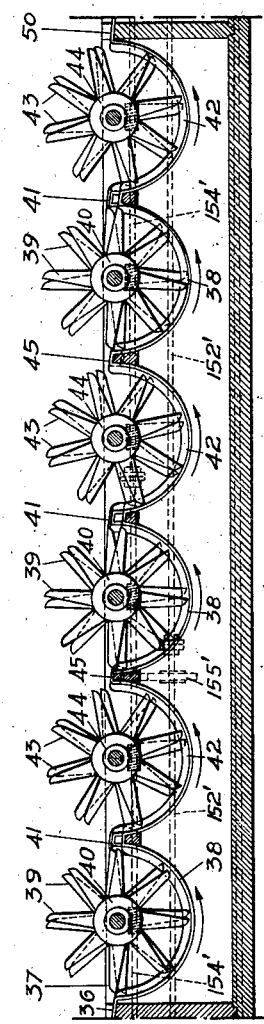
INVENTOR
Kurt T. Potthoff
BY
Edwards, Bower & Pool
ATTORNEYS April 9, 1935. K. T. POTTHOFF 1,997,013
METHOD AND APPARATUS FOR TREATING PIPES
Filed Nov. 18, 1930 9 Sheets-Sheet 2
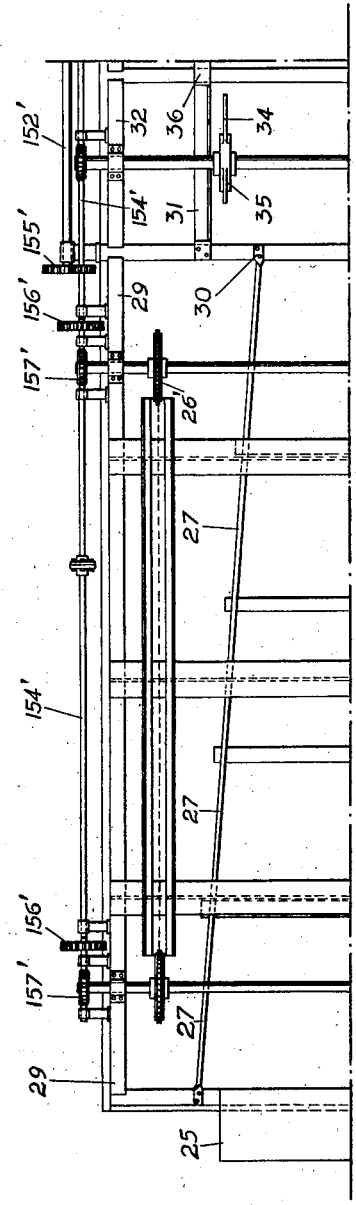
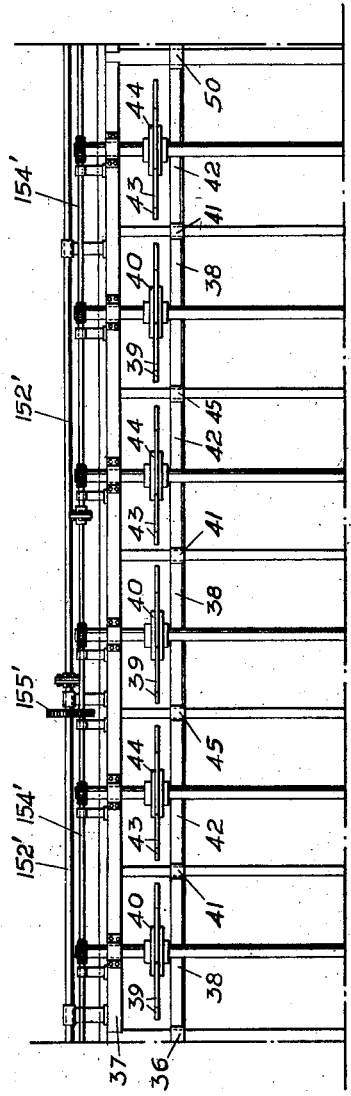

April 9, 1935.  K. T. POTTHOFF  1,997,013
METHOD AND APPARATUS FOR TREATING PIPES
Filed Nov. 18, 1930  9 Sheets-Sheet 3
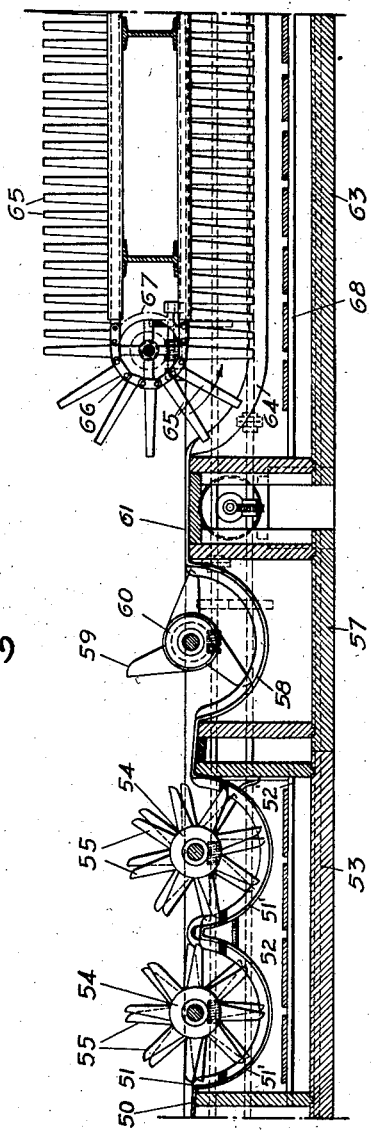
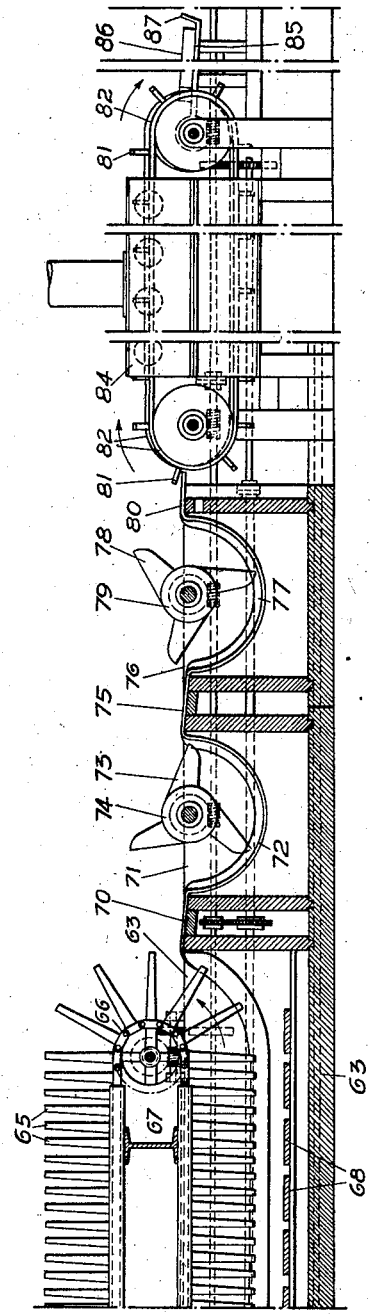

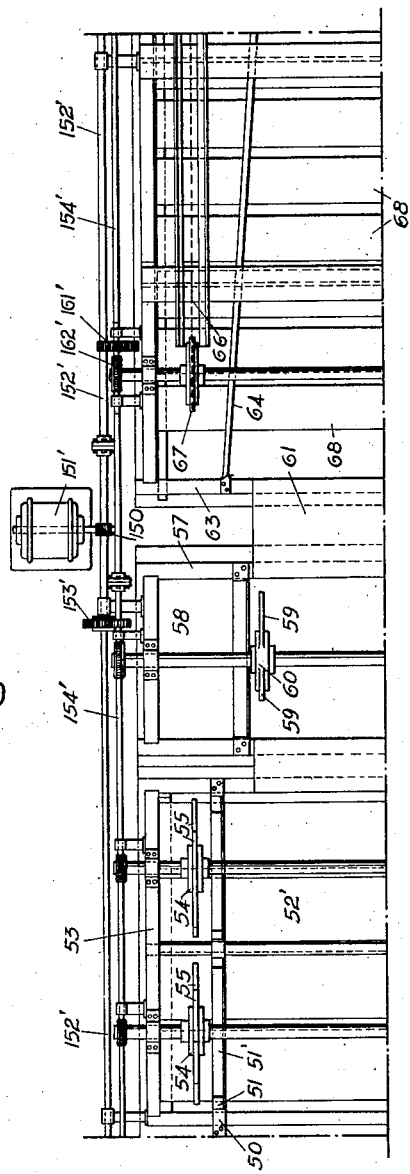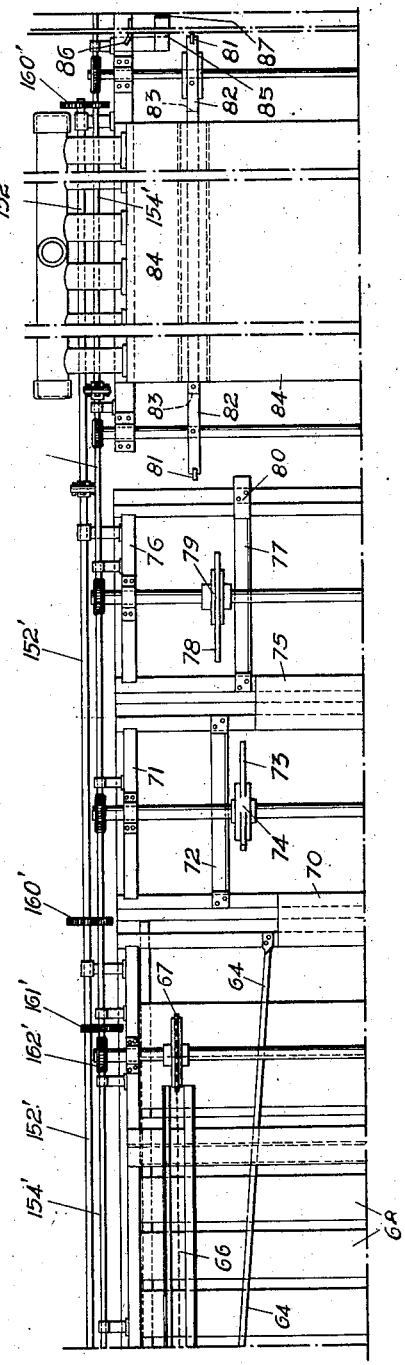

April 9, 1935. K. T. POTTHOFF 1,997,013
METHOD AND APPARATUS FOR TREATING PIPES
Filed Nov. 18, 1930 9 Sheets-Sheet 5

INVENTOR
Kurt T. Potthoff
BY
Edwards, Bower & Pool
ATTORNEYS

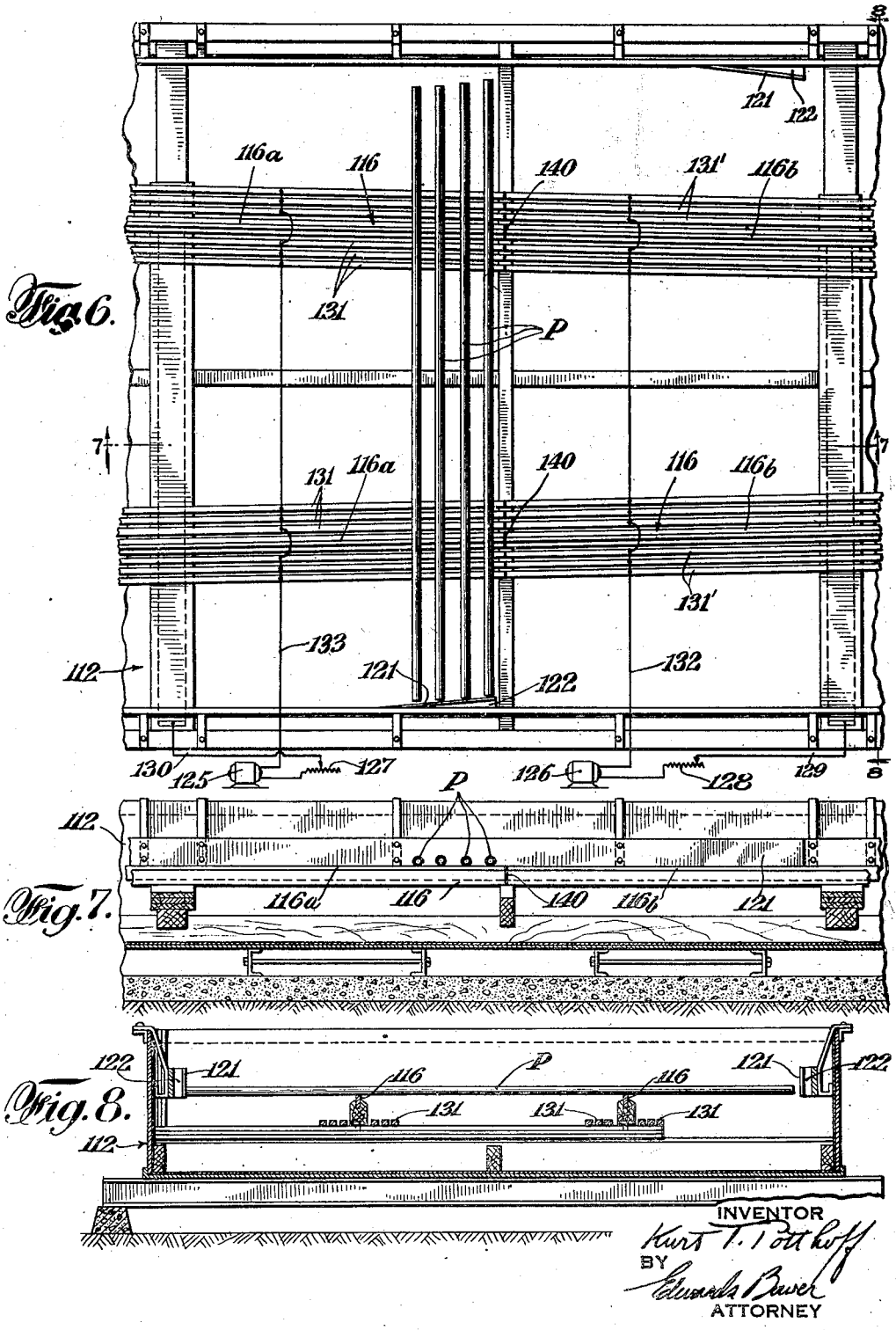

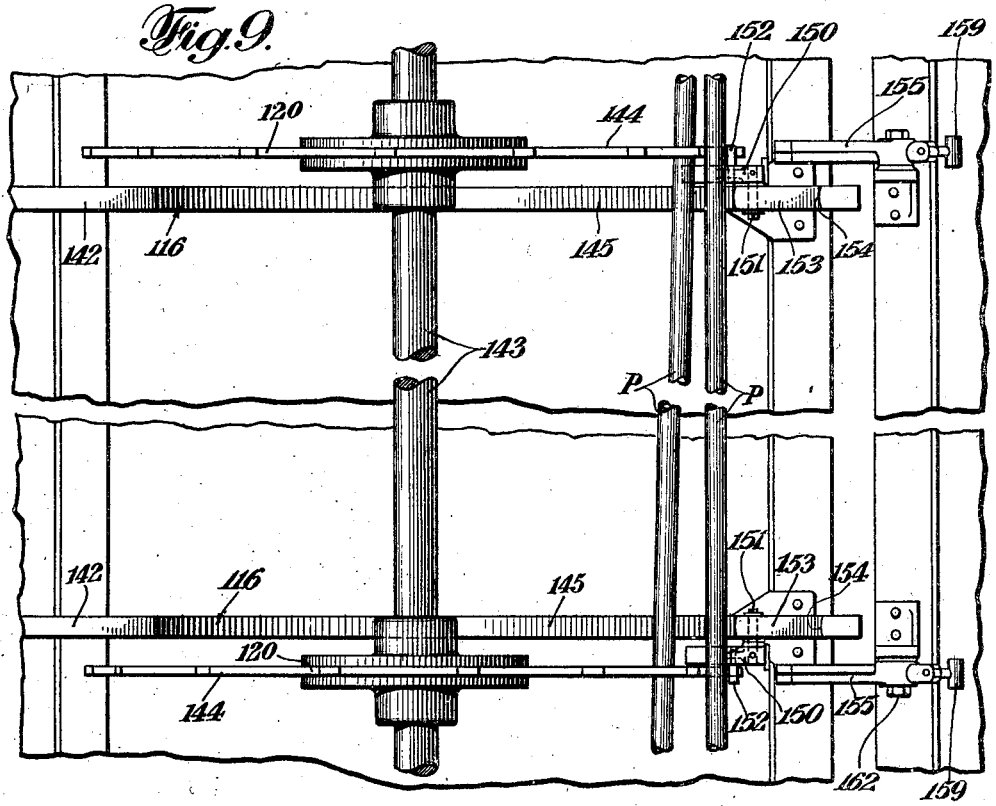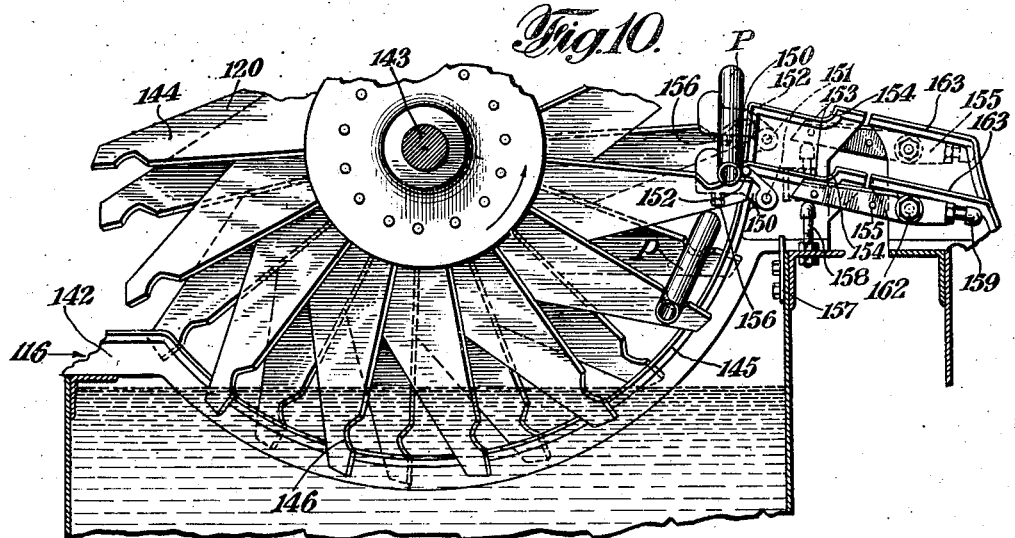

April 9, 1935. K. T. POTTHOFF 1,997,013
METHOD AND APPARATUS FOR TREATING PIPES
Filed Nov. 18, 1930 9 Sheets-Sheet 8
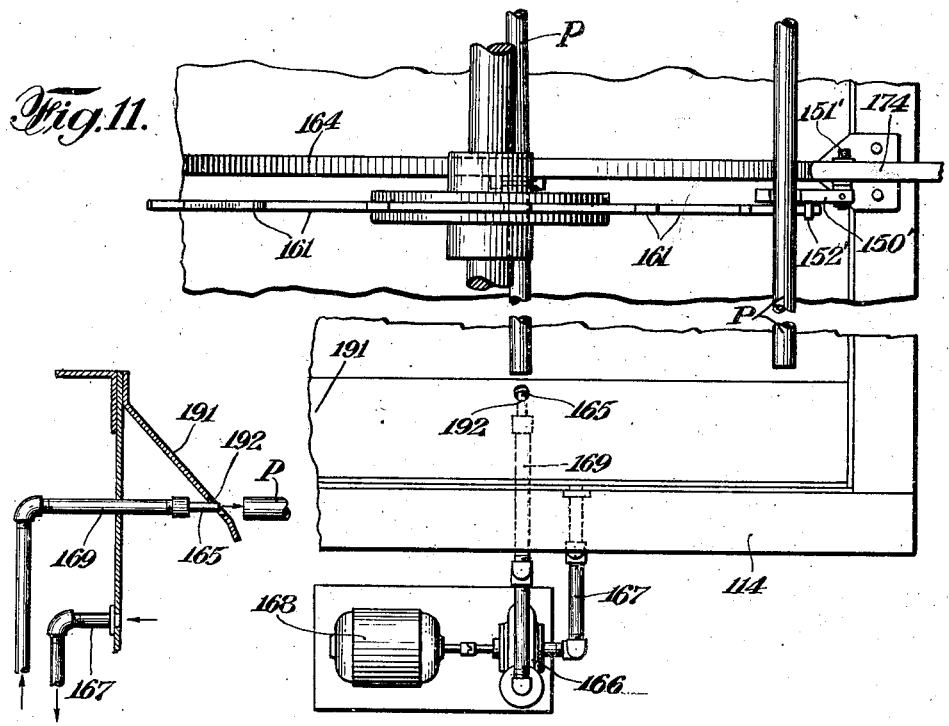
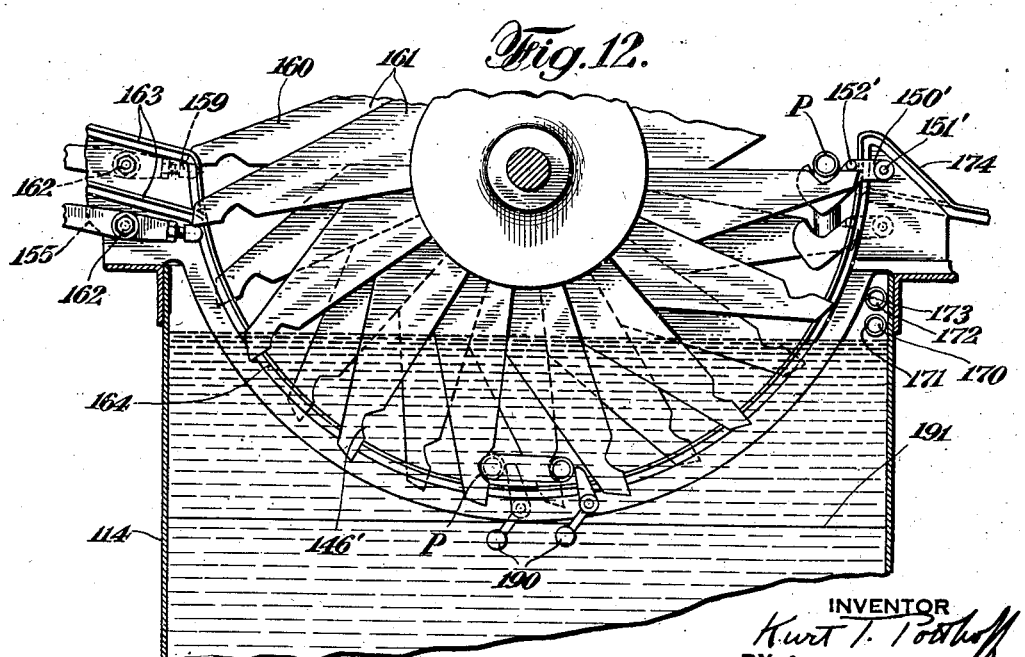

Patented Apr. 9, 1935

1,997,013

UNITED STATES PATENT OFFICE 1,997,013

METHOD AND APPARATUS FOR TREATING PIPES

Kurt Theodore Potthoff, Brooklyn, N. Y., assignor to U. S. Galvanizing & Plating Equipment Corporation, Brooklyn, N. Y., a corporation of West Virginia Application November 18, 1930, Serial No. 496,426

45 Claims. (Cl. 204—5)

This invention relates to a method for treating pipes and apparatus therefor.

The object of the invention is to provide a method whereby raw pipe with surface scale, oil and the like may be passed through a series of operations to treat it by cleaning and subsequent plating where desired, and finally drying the pipe so that the pipe will be completely cleaned and dried and ready for coating on the inside, and it will be either plated on the outside or ready for any subsequent outside coating.

A further object of the invention is to provide apparatus for use in said treatment.

Figure 5:
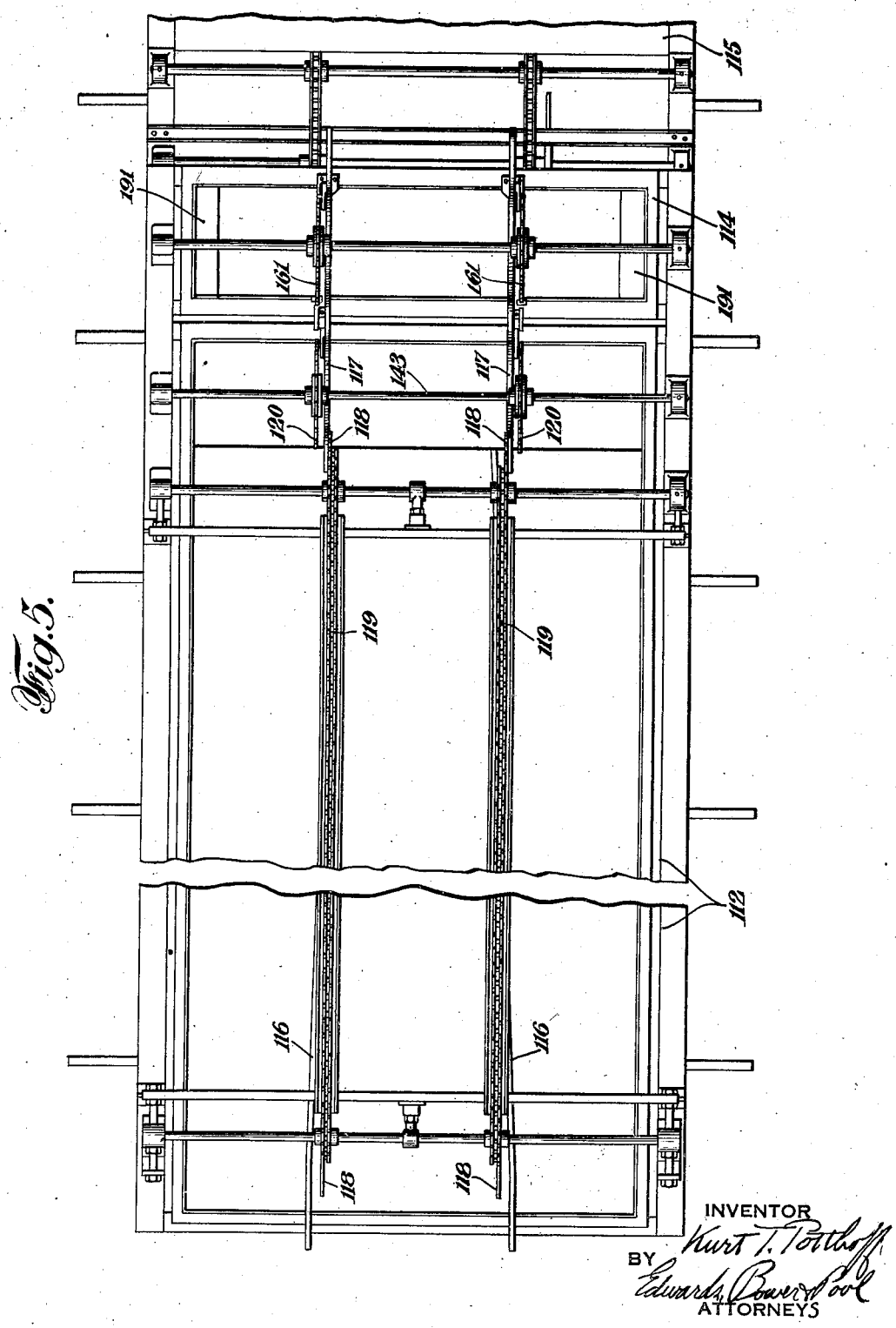

In the accompanying drawings illustrating the invention:

Figs. 1, 2, 3 and 4 are sectional elevation views of successive portions of apparatus adapted to carry out the invention, and Figs. 1a, 2a, 3a and 4a are corresponding plan views of the same, Fig. 5 is a plan view of a portion of plating apparatus illustrating a modification.

Figure 13:
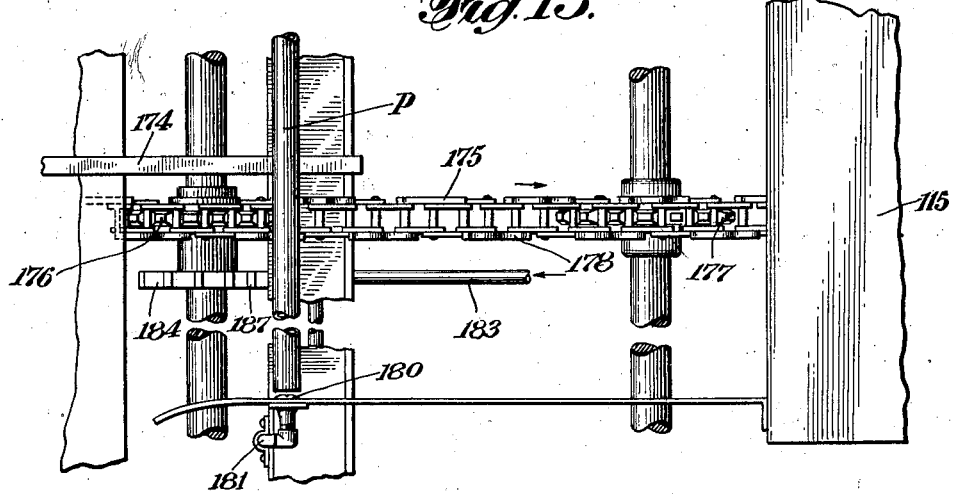
Figure 14:
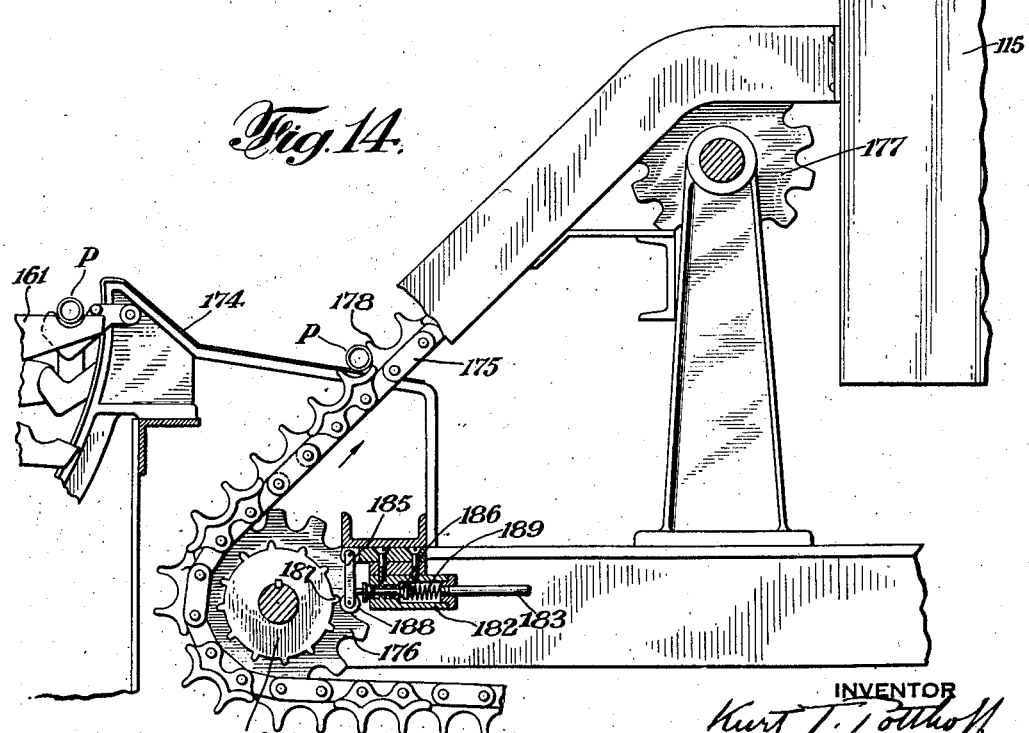

Fig. 6 is a view similar to Fig. 5 and showing a portion of the plating tank on a large scale, Fig. 7 is a vertical sectional view taken longitudinally on the line 7—7 of Fig. 6, Fig. 8 is a transverse section of Fig. 6 taken on the line 8—8, Fig. 9 is a horizontal plan view of a portion of the apparatus at the end of the plating tank shown in Fig. 5, Fig. 10 is a vertical elevational view of the apparatus shown in Fig. 9, Fig. 11 is a plan view of a portion of the rinsing apparatus following the plating tank, Fig. 12 is a vertical elevational view of the apparatus shown in Fig. 11, Fig. 13 is a plan view of a portion of the final feed to the drier, and Fig. 14 is a vertical elevational view of the apparatus shown in Fig. 13.

The pipes to be treated are fed to the machine along table 25 or by suitable automatic feeding conveyor means to the conveyor in such sequence as not to become jammed between the conveyor arms 26. Usually one large pipe or two or more small pipes will be fed to each successive space between said arms 26 which lower the pipes along the tracks 27 and into the cleaning liquid 28 in the tank 29. The liquid 28 is any desired cleaning solution such as an alkali for removing grease and the like from the outside of the pipe. Where it is desired to remove grease or the like from the inside of the pipe the conveying means 26, 27 may be replaced by conveying means 38, 39, 40 hereinafter described. Current may be supplied to the articles by providing the tracks 27, 38 or portions of them with cathode strips contacting with the pipes, and at the same time supplying current to the liquid by an anode terminal.

The arms 26 roll the pipes along the tracks 27 through this solution and then carry the pipes up out of the solution, permitting the liquid to drain off and passing the pipes on to incline 30 and semicircular tracks 31 in the rinsing tank 32. The rinsing fluid 33 such as water in this tank removes the cleaning liquid and the pipes are carried up out of this rinsing tank by the conveyor arms 34 of the rotary spiders 35 which are timed to receive and deliver the pipes individually or in groups of two or more.

The pipes delivered from the rinse 33 roll down incline 36 into a second treating liquid 37 such as an acid bath for "pickling" the pipes and removing scale and renewing the surfaces of the pipe preparatory to receiving a coating material. I have found it important to make the action of such a solution even and thorough particularly within the pipe. To attain this the solution within the pipe is constantly renewed so as not to become weakened and irregular in its action. Each pipe on rolling down incline 36 and semicircular tracks 38 is received by the arms 39 of spiders 40, these spiders being angularly offset as shown so that (viewed in endwise projection Fig. 2) the arms 39 at one end of the pipe are out of register with the arms at the other end. As the pipe passes down into the liquid one end of the pipe is thus higher than the other and the liquid will naturally tend to circulate thoroughly in the interior of the pipe displacing any air bubbles and the like and completely filling the pipe.

As the pipe reaches the lowermost portion of tracks 38 its ends are substantially at the same level and then as the following arms engage the pipe to lift it up along the tracks 38 the previously lower end is gradually raised above the other end so as to again provide for a natural circulation and the renewal of the solution and the removal of any accumulated air bubbles. The raised end of the pipe will pass out of the liquid 37 and the interior liquid will of course flow down toward the lower end and the entire pipe in inclined position will be raised out of the liquid so as to drain off the solution from the interior of the pipe. The pipe thus inclined is passed on to the correspondingly inclined support 41 across which it rolls to the semicircular tracks 42 where it is received by the arms 43 of spiders 44. These spiders 44 are offset with relation to each other in a direction opposite to the offset of the spiders 40 so that the inclination of the pipe at the entrance portion of the tracks 42 is opposite to the inclination at the entrance portion of tracks 38. The pipe is thus carried down along the tracks 42 with its near end (Fig. 2) below the other end with the same advantageous natural circulation of the pickling liquid. Similarly at the bottom of tracks 42 the following arms 43 pick up the pipe and gradually reverse its inclination and carry it in inclined position up the discharge portion of tracks 42 draining it in a direction opposite to the previous draining and delivering the pipe to the inclined support 45 where it is deposited with its near end (Fig. 2) higher than its far end.

The conveyor units each alternately submerging the inclined pipe in the solution and lifting it in oppositely inclined positions are repeated in the tank 47 to subject the pipe to the action of the solution a desired number of times. In the apparatus shown there are six of these units.

The apparatus for renewal of the liquid within the interior of the article in alternate opposite directions is the subject matter claimed in my divisional application, Serial No. 238,004, now Patent No. 1,720,525.

From the last unit the pipe is delivered to the incline 50 down which it rolls to the tracks 51 and into the auxiliary bath 52 in tank 53 forming a pickle solution or acid dip or the like. In this tank the two conveyor spiders 54 with arms 55 tip and drain the pipes as explained in connection with the conveyor units of tank 47. Cathode strips 51' may be provided along the tracks 51 to supply current to the pipes while completely immersed in the liquid, an anode terminal 52' being provided to complete the circuit through the liquid. The cathode strips 51' should be so arranged as to make or break contact with the pipe only when the pipe is submerged in the liquid because discoloration or spotting may result if a cathode contact is made with a pipe not sufficiently submerged in the electrolyte. The pipes thus freshly cleaned, pickled and dipped are passed to the rinsing tank 57 into which they pass along tracks 58 to be carried up by the arms 59 of conveyor wheel 60 to the drain table 61. Along the drain table 61 the pipes roll to the next operation which in the specific apparatus shown is plating in the tank 63. In this tank the pipes are received on the tracks 64 and between the arms 65 carried by the conveyor chains 66 running on sprocket wheels 67 at each end of the tank. The tracks 64 may have metallic cathode strips along which the pipes are rolled by the conveyor arm 65 while the anodes 68 complete the circuit to galvanize or otherwise plate the pipes as they pass through the tanks. The pipes may be simply passed through a bath without supplying current where such bath will give a satisfactory coating without the current.

From the plating tank 63 the articles are lifted by the conveyor and pass to incline 70 along which they roll to the cold rinse tank 71, the pipes passing down into the tank on track 72 and being lifted therefrom by the conveyor arms 73 of the wheel 74. The pipes then pass along the incline 75 into the hot rinse tank 76 along the tracks 77 and are lifted out by the arms 78 of the wheel 79 and are thus delivered, cleaned and plated to the table 80.

From the table 80 the pipes are lifted by the lugs 81 of the conveyor chains 82 running on sprockets 83 at each end, the sprockets on one side being at a higher level than those on the other so that the pipe will be inclined as it is lifted from the table 80 and carried through the dried chamber 84 to which heat is supplied. This inclination of the pipe during the drying operation provides for a natural circulation of air through the pipe and also tends to move and drain away any liquid clinging to the surface of the pipe. A blower or circulating fan may also be used to pass air through the pipes, the blower being arranged to supply air to one side of the drier and exhaust it from the other side.

The conveyor 81—82 deposits the dried pipes on the inclined table 85 whereon they are aligned by the end guides 86—86 and rolled down to the end trough 87, the end guide 86 being adjustable for different lengths of pipes.

Adjustment of the mechanism to variations in the lengths of the pipes is also provided for in the apparatus shown, and the driving means is preferably such as to receive power at a single point such as 150', and transmit it by properly timed and coordinated mechanism to the various operating parts as shown.

In the apparatus shown in the drawings and referring to Fig. 3a a motor 151' through a worm and worm wheel drive rotates the primary shaft 152' and from this primary shaft spur gears drive secondary shafts at various points along the apparatus. Proceeding towards the left in the Figs. 3 and 3a spur gears 153' drive the secondary shaft 154' and this shaft in turn through worm and worm wheel connections drives the shafts of spiders 60, 54, 40 and 35. Other sets of similar spur gears 155' carry the drive from shaft 152' to 154' at other points so as not to accumulate any twist in the drive which might offset the parts out of desired synchronism. The extended portion of the shaft 154' through spur gears 156' and worm and worm wheel gearing 157' drives the sprockets 26' of the conveyor 26.

Proceeding in the opposite direction from point 150' the shaft 152' through two sets of spur gears 160' drives the secondary shaft 154', and this shaft through spur gears 161' and worm and worm wheel connections 162' drives the sprocket wheels 67, the shaft 154' through worm and worm wheel connections also driving the shafts of the spiders 74 and 79 and drive wheels 83.

Spur gears 153', 155' and 160' are, of course, accurately identical and by this drive the shafts 152' and 154' turn accurately with relation to each other with practically no relative twist, and there is substantially no lost motion or twist developed between the shaft 154' and the conveying means in contact with the rods or pipes being treated.

With pipes for conduit use, for instance where the interior is to be enameled and the exterior to be plated, it is necessary to have a perfectly clean surface for the plating and clean and dry for the enameling, and the process of this invention acting on all the surfaces of the pipe provides a complete treatment of the pipe surfaces to insure proper condition of them for both the exterior and the subsequent interior coating.

The steps of the process may be modified or amplified as desired to meet the particular condition of the pipes to be treated and to make the process perfectly effective and automatic. In such a modified process I may for instance introduce an electric cleaning and in other ways change the alkali and acid treatment steps, or the plating step may be omitted and the cleaned pipes dried in preparation for subsequent coating as by enameling inside or outside, or both.

Where the main problem is removal of scale, the pipes may be carried through an acid pickling treatment in one or more steps, and preferably using the acid in heated condition at a temperature for instance above 120° F.; and if desired an electric current may also be passed through the pipe surfaces during this pickling treatment. During this pickling treatment it is important to renew the liquid within the pipes thoroughly, for instance by a circulating nozzle apparatus of the type shown in Fig. 12. After the pickling the pipes are thoroughly rinsed of the pickling liquid and then coated, for instance plated either by a preliminary strike, which may be of an alkali or cyanide solution, and followed by a plating in a zinc sulphate solution or the like. In some instances it may be desirable to improve the surfacing of the pipe by interposing an electric cleaning operation between the acid pickling and the plating. In such a sequence the process will use first the acid treatment followed by a rinse and followed by the electric cleaning operation and then another rinse, and then the plating either in one coating or in two.

According to one modification of the process the first step is a "soaking" of the pipes in an alkali dip, the pipes being carried in and out of a cleaning solution, such for instance as caustic soda, a number of times so that both the interior and exterior of the pipe are completely subjected to the action of this solution. Then the caustic soda solution is rinsed off by immersion of the pipe in a rinse tank and the pipes are carried over into an electric cleaner solution. In this electric cleaner treatment pipes pass along conductor rails supplying current to the pipes, and each pipe is successively dipped in and removed from the electric cleaner solution a number of times, after which it is again rinsed.

The next step is an acid treatment of the pipes, first in an acid pickle in which they are repeatedly dipped with or without electric current and removed to give a thorough circulation of the acid in contact with all of the pipe surfaces and followed by an acid dip, the acid for instance being a mixture of sulphuric acid and hydrochloric acid. After the acid dip there is a double rinse in water to thoroughly remove all traces of the acid treatment.

I have found that for pipes covered with oil and scale the caustic treatment followed by the acid treatment, and particularly with the use of electric current during the second caustic treatment, gives a cleaning of the pipe of the utmost thoroughness and produces pipe surfaces best adapted for the subsequent coating operations. The tendency of the caustic treatment is to remove and dissolve the dirt and grease, and the thorough subjection of the surfaces to the repeated action of the caustic prepares these surfaces for the following acid treatment to remove any rust or scale adhering to the metal. The result is that the pipes are not only clean, but are acted upon by the successive caustic and acid treatments to provide bright new surfaces throughout the entire length of each pipe inside and outside.

After the caustic and acid treatments and the rinsing a preliminary layer of a coating such as zinc is applied by electroplating. Preferably the pipes are plated in an alkali solution such for instance as zinc cyanide solution. Then they are double rinsed and carried on to a second plating tank preferably containing zinc sulphate in plating solution. This sulphate plating may be carried on in two steps with different current densities, the one step having a relatively low current density and the other step a relatively high current density so that the layers of metal are in succession, first the preliminary deposit, then the final coating under relatively low or high current density and followed by a final deposit from the sulphate solution under relatively high or low current density.

The pipes thus cleaned throughout and coated by electroplating on the outside are then rinsed and dried, and are ready for use or for further coating inside, outside, or both.

The thorough cleaning and plating of this process gives a very regular surfacing and a very uniform coating on the outside of the pipe with the electroplated metal in close adherence on the metal of the pipe and without any tendency of the metal to flake or chip off in service.

In the cleaning and rinsing, it is very important that all surfaces of the pipe, the interior as well as the exterior, be reached with fresh liquid and that this liquid be continuously renewed and similarly the plated pipes must be protected against marring by rubbing as this will frequently polish the bright satin finish of the normal electro deposit and leave what appear to be marks or rings upon the surface. The pipes must, therefore, be accurately fed and guided without any jamming or rubbing of their surfaces.

In Fig. 5 is shown a plan view of a portion of the modified treating apparatus comprising for instance the sulphate zinc bath tank 112 receiving the pipes from the alkali strike at the left. Following tank 112 is the rinse tank 114 from which the pipes are conveyed to the dryer 115, the end of which is shown at the extreme right of the figure.

The feed as previously explained is automatic, the pipes being moved along the tracks 116, 117 by the arms or pins 118 of chains 119 and passed on to the delivery spiders 120 driven, by means not shown, in synchronism with the chains 119 so as to pick up and deliver the pipes from the plating bath.

As illustrated in Figs. 6, 7 and 8, the pipes P in tank 112 are preferably conveyed at right angles to the direction of travel and roll along the tracks 116 so as to be constantly in even contact therewith. Any irregularities causing the pipes to move to one side or the other will bring the ends of the pipes against the inclined surfaces 121 of guides 122 and move them back toward central position. The guides 122 are on each side of the tank and preferably in staggered relation as shown with the guides on one side opposite the spaces between the guides on the other. Any tendency of the pipes to work to one side or the other will bring them against the corresponding guides by which they will be pushed over toward the center and will not continue out of alinement or scrape along the side. The endwise movement of the pipe also distributes the area of track contact with the pipe and avoids marking of the pipes which would tend to result if the pipe were permitted to run over against the tank side for any considerable distance.

In order to provide for a definite rate of electro deposit in one part of the tank from that in the other the tracks 116 are separated into forward sections 116a and rear sections 116b by insulation at joints 140, and separate supply circuits are provided for these sections, the front sections 116a receiving their current from the generator 125 through rheostat 127 and conductor 130 leading to the cathode section 116a, the circuit being completed through the solution and the anodes 131 connected to the anode conductor 133. Similarly the track sections 116b receive their current from the generator 126 through the rheostat 128 and conductor 129 leading to the track section 116b, the remainder of the circuit being completed through the solution and the anodes 131' and the anode conductor 132. In this way the tank may be divided into sections of any desired relative length, and the current density of the electroplating may be varied independently in these sections.

While it is important to convey the pipes through the plating solution by a rolling motion along the tracks 116 and with the pipes extending at right angles to the direction of travel, it is also desirable to remove the plating solution from the pipes by tipping them up at one end as they are lifted out of the solution so as to permit the liquid to drain away completely. As shown in Fig. 5, the conveyors 118, 119 carry the pipes through the plating solution along the tracks 116 which are carried upward at 142 to follow the upward movement of the arms or pins 118 at the delivery end of the conveyor where the pipes are passed on to the pickup spiders 120 fixed on shaft 143, which is rotated in synchronism with the conveyors 118, 119 to receive the pipes as they are delivered by said conveyors. The pipes are carried up along the discharge end 142 of the track 116 and drop down between the arms 144 of the spiders 120, which arms are offset with relation to each other so that the pipes will be held in an inclined position. In transferring from the chain conveyor to the spider conveyor the pipes are preferably lifted to or above the solution level, and they then pass downward along the delivery ends 145 of the tracks 116 to the bottom of the arc where they pause temporarily until the next succeeding arms pick them up and lift them up along the upwardly inclined portion of these tracks. These pickup arms 144 of the spiders 120 are provided with the notches 146, the outer surfaces of which are inclined backward with relation to the tracks so as to avoid pressing or wedging the pipes against the tracks. These notches pick up the pipes in inclined position and increase the inclination as they carry the pipe upward to the final delivery point, and during this inclination the solution completely drains from the interior of the pipes.

As shown in Figs. 9 and 10, each pipe in sequence is automatically lifted from the notches 146 by the lifting pawls 150 pivoted at 151 and having pins or dowels 152 engaged by the ends of the arms 144 to turn the pawls clockwise so that they will engage under the pipe (see Fig. 12) and lift it out of the notches 146 and move it over to the discharge inclines 153 down which it rolls to engage abutments 154 which hold it stationary in position to be picked up by the trippers 155 actuated in time with the spider of the following rinse tank. In normal active position pawls 150 hang downward just out of the way of the pipes and with their adjustable stops 156 bearing against the stop plate 157. The pipes P are in inclined position for draining during the entire lifting movement of the spiders 120, and are then rolled in inclined position along the inclines 153 and stopped against the stops 154 so that they are very thoroughly drained of the plating solution adhering to them from their treatment in the tank. The trip devices 155 are normally active as shown in Fig. 6 resting against the adjustable stops 158, but as shown in Fig. 12 the outer adjustable ends 159 of these trippers are arranged to be engaged by the ends of the arms or pins 160 of the rinse tank conveyor spiders 161, which ends press downwardly on the trippers to turn them around their pivots 162 and lift the pipes P above the shoulder 154 so that the pipes will roll down the entrance inclines 163 of the rinse tank tracks 164. This movement of the trippers 155 is timed so that the arms 160 will be in proper position to receive each pipe as it is delivered down the inclines 163 and a continued rotation of the spider 161 carries the pipe in inclined position down into the rinsing liquid in the rinsing tank 114 (Fig. 12), the inclined position of the pipe filling the pipe progressively from its lower to upper end with the rinsing liquid.

As indicated in Fig. 12 there is a short period as the pipe reaches the lower path of travel on the semi-circular track 164 where the pipe changes its position from the back of one pin or arm 160 to the front of the succeeding pin. At this point the pipe remains stationary and a nozzle 165 is placed at this position delivering a stream of the rinsing liquid through the pipe while it is stationary. A pump 166 receiving its supply through the pipe 167 and driven by the motor 168 supplies the nozzle 165 through the delivered pipe 169, the pump being in continuous operation during the operation of the rinsing tank.

While I have shown and described the liquid circulation effected by the nozzle 165 in connection with the rinse tank, such circulation is important in connection with the treatment in cleaning or pickling or other operations on the interior of the pipe, and it is particularly important in the pickling of the pipes to provide for the renewal of the liquid within the pipes to loosen and carry away any scale adhering there. Instead of using a liquid to supply the nozzle 165 air under pressure could be used, and when forced in a current through the pipe the air blast will displace the contained liquid ahead of it and the renewal liquid will follow providing a circulation of fluid through the pipe and renewing the pickling or other liquid therein. Instead of having the pipe pause to receive the circulation from the nozzle, it may be more convenient in some instances to arrange the nozzle to move temporarily with the pipe or where the motion of the pipe is sufficiently slow, the pipe and the nozzle may move relatively to each other during the circulating period. The important thing is to force out the used liquid within the pipe and renew it by a fresh supply, at the same time providing circulation for carrying out any scale or other matter of which the pipe is to be cleaned.

As shown in Fig. 12 the nozzle 165 is shown as opening through an orifice 192 in the guide 191 so that the pipes as they travel along are automatically positioned opposite the end of the nozzle and will not have any tendency to engage against the nozzle in an obstructing manner. The guide 191 is formed by an inclined strip extending inward and downward from the edge of the tank, and preferably on each side thereof and passing below the surface of the liquid and below the line of travel of the pipes. As the pipes are fed into the tank they are at an inclination and may become out of alinement so as to engage against the surface of the guide 191 on one side or the other whereupon their further movement will cause them to be pushed backward toward the center of travel and in proper alinement opposite the orifice of the nozzle 165.

Where the nozzle and guide combination in Fig. 12 is used in a tank having a relatively long horizontal movement of the pipe, on tracks for instance, a plurality of nozzles will be provided at desired intervals to repeatedly renew the treating liquid within the pipes, and guides 191 will be extended throughout the entire length of each side of the tank and provided with an orifice for each nozzle, the nozzles preferably being arranged alternately on opposite sides of the tank so as to give circulation first in one direction and then the other through the pipes.

The arms 160 of the spider 161 are provided with pockets 146' similar to the pockets 146 of the spiders 120 and acting in the same way to protect the plated coating of the pipe from injury during the lifting movement, which as shown in Fig. 12 reverses the inclination of the pipes as they are lifted from the rinsing liquid.

As the pipes leave the bath it is of great importance that they be protected from adherence of any dirt or impurities, and in order to keep the surface of the liquid clear, a series of air jets are provided by nozzle opening 171 in the side of the air pressure pipe 170 just above the surface of the liquid. These jets are directed slightly downward and along the surface and continuously blow along the surface to carry away any floating matter thereon and keep the surface absolutely clear and clean. As the pipes are lifted in inclined position from the surface, there is, therefore, no opportunity for them to carry up anything from the surface of the liquid, which is thus constantly blown by a draft of air. Above this air draft there is also provided the spray pipe 172 carrying a supply of clean water for spraying out through the nozzle openings 173 to further cleanse the outside of the pipes from any adhering drops of the rinse liquid. After this rinsing and cleaning the pipe is carried to its discharge position where it is lifted out of the pockets 146' by the delivery pawls 150', similar to the delivery pawls 150, and pivoted about the centers 151' and having pins 152' engaged by the ends of the arms 160 to lift the pawls and carry the pipes up and over the ends of the inclined delivery tracks 174 down which they roll to the feed mechanism carrying the pipes to and through the drier. As shown in Figs. 13 and 14 this feed mechanism comprises an endless chain 175 moving around the sprockets 176, 177 at the entrance end and having the links provided with a series of carrying pockets 178 of generally semi-circular form. The chain 175 moves continuously in the direction of the arrow and successively positions its pocket 178 to receive the pipes P. And each pipe as it reaches the chain conveyor is temporarily stationary as it is picked up by the pocket, and in this stationary condition is positioned in front of an air blast nozzle 180 connected by pipe 181 and valve mechanism 182 receiving a supply of compressed air through the pipe 183. Valve mechanism 182 is automatically actuated by the cam 184 and lever 185 to open the valve and admit the blast of air to the pipe only when a pipe is in the position shown to receive it, the lever 185 moving to the right to open the valve 186, at which time one of the cam projections 187 engages the roller 188 of the lever. A spring 189 is provided to insure return of the valve to its seat.

The pipes P thus subjected to the final air blast are completely rid of any adhering drops of moisture remaining from the previous treatments, and are then carried on to the drier 115 where they are heated to remove the last remaining traces of moisture from all of their surfaces.

Guides are provided throughout the apparatus to retain the pipes properly alined, and the various stops and movements are so timed as to carry the pipes in proper sequence through all of the various steps of the process. As shown in Figs. 11 and 12 wherever the pipes are positioned for flushing while under the surface of the solution, they may be stopped and temporarily held by yieldable members, such as the pivoted levers 190 engaging each pipe and holding it accurately placed with relation to the nozzle 165 until the next following pin or arm 160 engages the pipe to bring it onward through the bath.

This case is a continuation in part of my prior application, Ser. No. 24,053, for Method and apparatus for treating pipes, bars, etc., filed the 18th day of April, 1925, Patent No. 1,789,596, granted January 20, 1931.

I claim:

1. In apparatus for treating articles by positioning them through a series of operations, automatically feeding them from the first operation to the last, the combination with a series of conveyors, of driving means therefor comprising a source of power, connecting means, longitudinal shafting running lengthwise of said apparatus, a series of separate cross shafts connected to said conveyors and connected means between said cross shafts and said shafting so as to drive all of the conveyors in timed relation to each other.

2. In apparatus for coating elongated articles, such as tubes, pipes and the like having bores small in comparison with their lengths, the combination with a tank adapted to contain a treating liquid, of means for automatically feeding the articles through said tank comprising supporting tracks at each side of the tank engaging opposite end portions of the articles, means for automatically decelerating and rinsing the articles after treating, means for automatically coating by electroplating said articles, a second rinsing means, and means for automatically drying said articles while conveying them in substantially horizontal position comprising means for forcing circulation of air through the pipes during said drying.

3. The process of coating pipes having their bores smaller in comparison with their lengths comprising carrying said pipes in sequence in substantially horizontal position through a bath containing an alkali, automatically rinsing the interior surfaces of said pipes, then carrying said pipes through an alkali bath and supplying current to said pipes, then rinsing said interior surfaces of said pipes, and then immediately subjecting them to pickling treatment by carrying them in substantially horizontal position through an acid bath, and renewing the liquid within them and then electroplating said pipes.

4. The process of coating pipes having their bores small in comparison with their lengths comprising carrying said pipes in sequence in substantially horizontal position through an acid bath to subject them to a pickling treatment, then treating said pipes in an alkali bath, automatically rinsing said pipes, and then automatically carrying them in substantially horizontal position through a plating bath.

5. The process of coating pipes having their bores small in comparison with their lengths comprising carrying said pipes in sequence in substantially horizontal position through a bath containing an alkali, automatically rinsing said pipes, then carrying said pipes through an alkali bath and supplying current to said pipes, then rinsing said pipes, and then subjecting them to pickling treatment by carrying them in substantially horizontal position through an acid bath, and then electroplating said pipes in a cyanide zinc solution and further plating said pipes in a sulphate zinc solution.

6. The process of coating pipes having their bores small in comparison with their lengths comprising carrying said pipes in sequence in substantially horizontal position through a bath containing an alkali automatically rinsing said pipes, then carrying said pipes through an alkali bath and supplying current to said pipes, then rinsing said pipes, and then subjecting them to pickling treatment by carrying them in substantially horizontal position through an acid bath, and then electroplating said pipes first with an initial coating of one current density followed by another coating at a different current density.

7. In pipe treating apparatus the combination with a tank containing a treating liquid and tracks below the surface of said liquid, of means for conveying the pipes along said tracks in substantially horizontal position, and separate delivery apparatus comprising means receiving said pipes from said conveying apparatus, and tipping them to inclined position while lifting them from said liquid and delivering them out of said tank said means including members movable to lift said pipe in inclined position.

8. In pipe treating apparatus the combination with tracks along which the pipes are conveyed, of means for delivering said pipes comprising a movable conveyor having lifting surfaces engaging said pipes and moving them away from and out of contact with said tracks while still under the surface of the liquid while raising the pipes to delivery position.

9. In pipe treating apparatus the combination with tracks along which the pipes are conveyed, of means for delivering said pipes comprising a movable conveyor having lifting surfaces en-engaging said pipes and moving them away from and out of contact with said tracks while still under the surface of the liquid while inclining and raising the pipes to delivery position.

10. In pipe treating apparatus the combination with tracks along which the pipes are conveyed, of means for delivering said pipes comprising a movable conveyor having lifting surfaces engaging said pipes and moving them away from and out of contact with said tracks while still under the surface of the liquid while raising the pipes to delivery position, and means for automatically removing said pipes from said conveyor at delivery position.

11. In pipe treating apparatus the combination with conveying means carrying the pipes through a treating liquid, of means for renewing the treating liquid within the pipes by forcing a fluid current therethrough while the pipes are in said liquid.

12. In pipe treating apparatus the combination with conveying means carrying the pipes through a treating liquid in substantially horizontal position, of means for renewing the treating liquid within the pipes by forcing a fluid current therethrough from end to end while the pipes are in said liquid, said means comprising a fluid pressure nozzle and means for supplying fluid under pressure thereto.

13. In pipe treating apparatus the combination with conveying means carrying the pipes through a treating liquid in substantially horizontal position, of means for renewing the treating liquid within the pipes by forcing a fluid current therethrough from end to end while the pipes are in said liquid, said means comprising a fluid pressure nozzle and means for supplying fluid under pressure thereto, said pipe and nozzle being positioned to have substantially no relative displacement during the forcing of circulation through said pipe.

14. In pipe treating apparatus the combination with conveying means carrying the pipes into and through a treating liquid in a tank in substantially horizontal position, the combination with a guiding means adapted to center the pipes, of a nozzle having a fluid pressure supply to force circulation through said pipes from end to end as guided in position by said guiding means.

15. In pipe treating apparatus the combination with conveying means carrying the pipes into and through a treating liquid in a tank in substantially horizontal position, of a guide on each side of said tank, and a plurality of fluid circulating nozzles arranged in staggered relation on opposite sides of said tank and in position to direct their jets into the ends of said pipes as positioned by said guides.

16. In a pipe treating apparatus the combination with a tank adapted to contain a treating liquid, of conveying means for carrying a continuous sequence of pipes into and through said liquid, of guiding means for centering said pipes comprising an inclined strip running lengthwise of the tank and extending below the surface of the liquid therein and adapted to move the pipes toward the center whenever they move to the side beyond a predetermined amount.

17. In pipe treating apparatus the combination with conveying means carrying the pipes into and out of the treating liquid and stopping the pipe temporarily within said liquid, and nozzle means for automatically forcing a stream of said liquid through said pipes in sequence while in said stopping position.

18. In pipe treating apparatus the combination with means for automatically conveying the pipes in continuous sequence into and out of a treating liquid, of means at the delivery end of said apparatus and adjacent the surface of the liquid therein for forcing a current of air along the surface of the liquid while said pipes are being lifted therefrom.

19. In pipe treating apparatus the combination with means for automatically conveying the pipes in continuous sequence into and out of a treating liquid, of means at the delivery point from said liquid for forcing a current of air along the surface of the liquid while said pipes are being lifted therefrom, and spraying means for immediately washing the surface of the lifted pipes.

20. In pipe treating apparatus the combination with means for lifting the pipes in continuous sequence from a treating liquid, means for stopping said pipe temporarily in draining position over said liquid, subsequent treating apparatus, an intermediate means automatically actuated by said subsequent treating means for moving said pipes from said stop position in timed relation with the movement of the said subsequent treating means.

21. In apparatus for treating pipes the combination with means for delivering the pipes from a treating liquid, of an air blast nozzle positioned at one side of the line of travel of said pipes, and means for automatically forcing a blast of air from said nozzle through said pipes to remove adhering drops of liquid therefrom.

22. In apparatus for treating pipes the combination with means for delivering the pipes from a treating liquid, of an air blast nozzle positioned at one side of the line of travel of said pipes, and means for automatically forcing a blast of air from said nozzle through said pipes to remove adhering drops of liquid therefrom, said air blast means operating intermittently in timed relation to the pipe conveying means.

23. The process of treating pipes in sequence comprising carrying said pipes in substantially horizontal position through a bath containing an alkali, automatically rinsing said pipes and then carrying said pipes through an acid bath to subject them to pickling treatment, supplying an electric current to said pipes to further treat their surfaces, automatically rinsing said pipes, and then automatically drying said pipes while conveying them in substantially horizontal position.

24. The process of treating pipes in sequence comprising carrying said pipes in substantially horizontal position through an alkali cleaner bath, an acid cleaner bath, automatically rinsing said pipes between said baths and at the end of the acid cleaner bath, and supplying an electric current to said pipes during said treatment, and automatically drying said pipes while conveying them in substantially horizontal position.

25. In apparatus for treating elongated articles, such as tubes, pipes and the like, the combination with a tank containing an alkali cleaner bath, of means for automatically feeding the articles through said tank and circulating the liquid of said bath through said articles, means for automatically rinsing the articles after cleaning, a tank adapted to contain an acid cleaner bath, means for automatically feeding the articles through said tank and circulating the liquid of said bath through said articles, means for automatically rinsing the articles after cleaning in said acid cleaner, and means for automatically drying said pipes while conveying them in substantially horizontal position.

26. In apparatus for treating elongated articles, such as tubes, pipes and the like, the combination with a tank containing an alkali cleaner bath, of means for automatically feeding the articles through said tank and circulating the liquid of said bath through said articles, means for automatically rinsing the articles after cleaning, a tank adapted to contain an acid cleaner bath, means for automatically feeding articles through said tank and circulating the liquid of said bath through said articles, means for automatically rinsing the articles after cleaning in said acid cleaner, and means for automatically drying said pipes while conveying them in substantially horizontal position comprising means for circulating air through the pipes during said drying.

27. The process of treating tubes, pipes and the like in sequence comprising carrying said pipes in substantially horizontal position into, through and out of an acid bath to subject them to pickling treatment, and subsequently passing them in substantially horizontal position through an acid dip to treat their surfaces in separate acid solutions.

28. The process of treating tubes, pipes and the like in sequence comprising carrying said pipes in substantially horizontal position through a bath containing an alkali, automatically rinsing said pipes and then carrying said pipes in substantially horizontal position into, through and out of an acid bath to subject them to pickling treatment, and subsequently passing them in substantially horizontal position through an acid dip to treat their surfaces in separate acid solutions.

29. The process of treating tubes, pipes and the like in sequence comprising carrying said pipes in substantially horizontal position through a bath containing an alkali, automatically rinsing said pipes, and then carrying said pipes in substantially horizontal position into, through and out of an acid dip solution, and then automatically rinsing said pipes to remove the traces of solution from the surfaces thereof.

30. The process of treating tubes, pipes and the like in sequence comprising carrying said pipes in substantially horizontal position into, through and out of an acid cleaner bath to subject them to pickling treatment, and then automatically rinsing said pipes to remove the traces of acid from the surfaces thereof, and then automatically drying said pipes while conveying them in substantially horizontal position.

31. The process of treating tubes, pipes and the like in sequence comprising carrying said pipes in substantially horizontal position into, through and out of an acid bath to subject them to pickling treatment, and subsequently passing them in substantially horizontal position through an acid dip to treat their surfaces in separate acid solutions, and then automatically drying said pipes while conveying them in substantially horizontal position.

32. Apparatus for coating elongated pipes in sequence comprising means for carrying said pipes in substantially horizontal position through an acid bath to subject them to pickling treatment said means comprising tracks engaging opposite ends of said pipes and conveying means adjacent said tracks, subsequent means for automatically rinsing said pipes, and means for then automatically carrying them in substantially horizontal position through a plating bath, and a drying apparatus automatically drying the inside of said pipes while conveying them in substantially horizontal position.

33. Apparatus for coating elongated pipes in sequence comprising means for carrying said pipes in substantially horizontal position through an acid bath to subject them to pickling treatment said means comprising tracks engaging opposite ends of said pipes and conveying means adjacent said tracks and circulating means renewing the treating liquid within said pipes, means automatically rinsing said pipes, and means automatically carrying them in substantially horizontal position through a plating bath, and drying apparatus automatically drying the inside of said pipes while conveying them in substantially horizontal position.

34. Apparatus for coating elongated pipes in sequence comprising means for carrying said pipes in substantially horizontal position through a bath containing an alkali said means comprising tracks engaging opposite ends of said pipes and conveying means adjacent said tracks, means automatically rinsing said pipes and means for carrying said pipes through an acid bath to subject them to pickling treatment, means automatically rinsing said pipes after pickling and apparatus automatically carrying them in substantially horizontal position through a plating bath and drying apparatus automatically drying the inside of said pipes while conveying them in substantially horizontal position.

35. Apparatus for coating elongated pipes in sequence comprising means for carrying said pipes in substantially horizontal position through a bath containing an alkali said means comprising tracks engaging opposite ends of said pipes and conveying means adjacent said tracks, means automatically rinsing said pipes and apparatus for carrying said pipes through an acid bath to subject them to pickling treatment, means supplying a current to said pipes to further treat their surfaces, means automatically rinsing said pipes, means for automatically carrying them in substantially horizontal position through a plating bath, and drying means automatically drying the inside of said pipes while conveying them in substantially horizontal position.

36. Apparatus for coating elongated pipes in sequence comprising means for carrying said pipes in substantially horizontal position through an alkali cleaner bath and an acid cleaner bath in succession said means comprising tracks engaging opposite ends of said pipes and conveying means adjacent said tracks, means automatically rinsing said pipes, means automatically carrying them in substantially horizontal position through a plating bath, and drying apparatus automatically drying the inside of said pipes while conveying them in substantially horizontal position.

37. Apparatus for coating elongated pipes in sequence comprising means for carrying said pipes in substantially horizontal position through an alkali cleaner bath and an acid cleaner bath said means comprising tracks engaging opposite ends of said pipes and conveying means adjacent said tracks, means supplying current to said pipes during at least a portion of said cleaning treatment, means automatically rinsing said pipes, and apparatus for automatically carrying them in substantially horizontal position through a plating bath, and drying apparatus automatically drying the inside of said pipes while conveying them in substantially horizontal position.

38. The process of treating elongated tubes, pipes and the like in sequence comprising carrying said pipes having a length greater than their bore in substantially horizontal position through a bath containing an alkali, and renewing the liquid within the interior of said elongated pipes or tubes in said bath to treat the interior surfaces while continuously submerged in said bath, and then automatically rinsing the interior surfaces of said pipes while carrying them in substantially horizontal position.

39. The process of treating elongated tubes, pipes and the like in sequence comprising carrying said pipes having a length greater than their bore in substantially horizontal position through an acid bath to subject them to pickling treatment, and automatically renewing the liquid within said elongated pipes or tubes while in said bath so as to treat the interior surfaces of the pipes or tubes, and then automatically rinsing the interior of said pipes while carrying them in substantially horizontal position.

40. The process of treating elongated tubes, pipes and the like in sequence comprising carrying said pipes having a length greater than their bore in substantially horizontal position into, through and out of a treating bath, automatically renewing the liquid of the bath within the interior of said elongated pipes as they pass through the bath so as to subject the interior surfaces of the pipes to treatment, then automatically rinsing the interior surfaces of said pipes while carrying them in substantially horizontal position, and automatically renewing the rinsing liquid within said pipes so as to remove the treating liquid from the interior surfaces of the tubes or pipes.

41. An apparatus for treating pipes, the combination with means for carrying said pipes downward of a tank for receiving said pipes and holding a treating liquid, means for horizontally moving said pipes through said liquid and upward out of the liquid at the opposite end of the tank, and guiding means for moving said pipes endwise comprising inclined guide surfaces extending along the side of the tank below the level of the liquid therein.

42. In apparatus for coating elongated articles such as tubes, pipes and the like having their bores small in comparison to their lengths, the combination with a tank adapted to contain a treating liquid, of means comprising spaced supporting tracks at opposite end portions of the tubes and corresponding conveyors on each side for automatically feeding the articles in a single row through said tank submerged in said treating liquid, pressure means renewing the liquid within said articles while under the surface of the liquid, means for automatically rinsing the articles after treating comprising means for holding them stopped in inclined position, and means for automatically coating said articles by electroplating and delivering them in finished condition.

43. In apparatus for coating tubular articles having their bores small in comparison with their lengths, the combination with treating means comprising spaced tracks at opposite end portions of the articles and corresponding conveyors on each side adapted to immerse the articles in a treating liquid, of means to force circulation end to end of the articles and renew the liquid within said articles while under the surface of the liquid, and means for subsequently conveying said articles and coating the freshly treated surfaces thereof without intermediate manual handling.

44. In apparatus for subjecting articles to the simultaneous action of a liquid and electric current, the combination with means for containing the liquid, conveying means for moving said articles into and out of said liquid comprising continuous supporting tracks for the articles, means for completing an electric circuit through said article after it has been submerged in said liquid comprising contact means below the surface of the liquid directly engaging said article only when the latter has passed into said liquid and breaking said circuit before said article is removed from said liquid.

45. In apparatus for treating articles by passing them through a series of operations and automatically feeding them from the first operation to the last in predetermined timed relation for each article, the combination with a series of conveyors moving said articles in sequence, of driving means therefor comprising a source of power intermediate the ends of the apparatus, a primary shaft extending in each direction from said source of power, a longer secondary shaft extending substantially throughout the length of said apparatus and connected thereto at a plurality of points and means for driving said secondary shaft from said primary shaft at a plurality of points.

KURT THEODORE POTTHOFF.